(12) United States Patent
Palese

(10) Patent No.: US 6,585,432 B1
(45) Date of Patent: Jul. 1, 2003

(54) OPTOELECTRONIC COMMUNICATION SYSTEM IN TURBULENT MEDIUM HAVING ARRAY OF PHOTODETECTORS AND TIME COMPENSATION

(75) Inventor: Stephen P. Palese, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 595 days.

(21) Appl. No.: 09/587,124

(22) Filed: Jun. 2, 2000

(51) Int. Cl.[7] .................. H04B 10/00; H04B 10/12; H04B 10/04; H04B 10/06
(52) U.S. Cl. .................. 398/139; 398/141; 398/183; 398/128; 398/201; 398/212
(58) Field of Search .................. 359/110, 111, 359/117, 129, 130, 131, 133, 134, 154, 160, 161, 169, 170, 188, 195, 152, 193; 250/201.9, 550, 494.1, 503.1, 227.17; 356/121

(56) References Cited

U.S. PATENT DOCUMENTS

| | | | | |
|---|---|---|---|---|
| 4,490,039 A | * | 12/1984 | Bruckler et al. | 356/121 |
| 4,943,709 A | * | 7/1990 | Grinberg et al. | 250/201.9 |
| 5,015,054 A | * | 5/1991 | Chaffee | 385/27 |
| 5,389,782 A | * | 2/1995 | Hilliard | 250/227.17 |
| 5,952,818 A | * | 9/1999 | Zhang et al. | 324/96 |

* cited by examiner

Primary Examiner—Leslie Pascal
Assistant Examiner—Dalzid Singh
(74) Attorney, Agent, or Firm—Robert W. Keller

(57) ABSTRACT

An optoelectronic communication system for use with an optical signal that passes through a turbulent environment is disclosed. The communication system comprises an optical transmitter for transmitting an optical signal, and an optoelectronic receiver. The optoelectronic receiver comprises a reflector for collecting the optical signal and for propagating a plurality of portions of it. A plurality of first optoelectronic detectors responds to a selected portion of the optical signal and each develops a plurality of first electrical signals. A probe laser generates an optical probe beam. Means are responsive to the plurality of first electrical signals and changes a characteristic of the optical probe beam corresponding to the information. A second optoelectronic detector responds to the changed characteristic and develops an output electrical signal representative of the information contained in the received optical signal. Alternatively, the optical signal is amplified and sent directly through a ground-based optical fiber network such that the output signal is optical. In another aspect, a time compensation network serves to synchronize the probe and the signal beams.

24 Claims, 10 Drawing Sheets

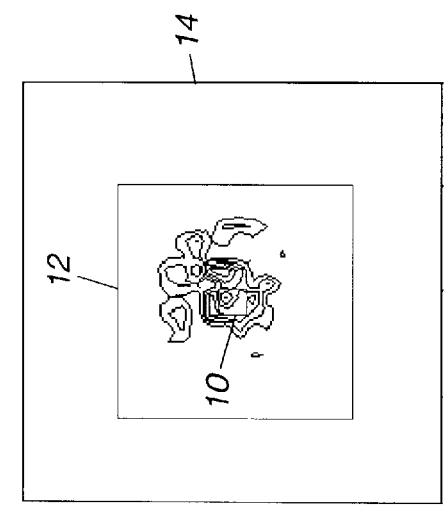
Fig. 1A Signal beam at time t1
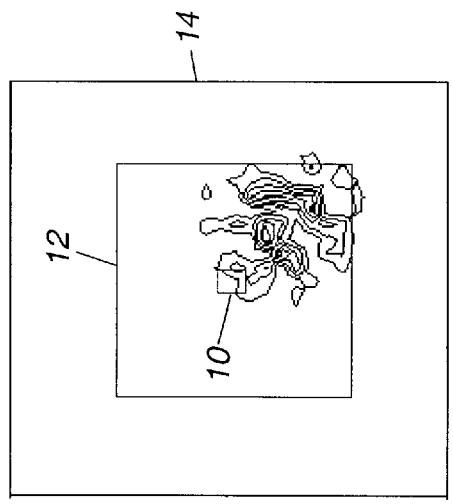
Fig. 1B Signal beam at time t2
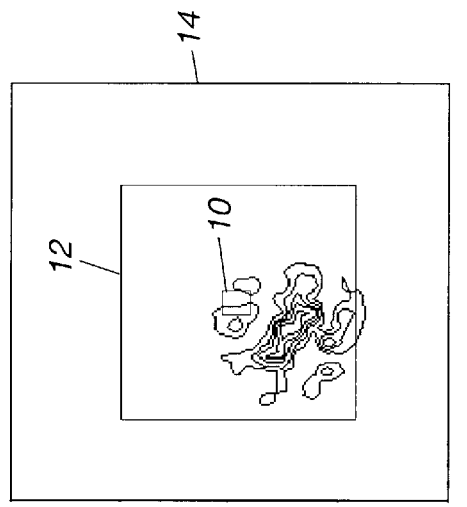
Fig. 1C Signal beam at time t3

OPTOELECTRONIC COMMUNICATION SYSTEM IN TURBULENT MEDIUM HAVING ARRAY OF PHOTODETECTORS AND TIME COMPENSATION

CROSS-REFERENCE TO RELATED APLLICATION

The present application is related to co-pending U.S. patent application Ser. No. 09/586,513, filed concurrently herewith, entitled: "Optical Communication System Using Optical Transcription Material" by Stephen Palese, assigned to the same assignee as this present invention, and its contents are incorporated herein by reference.

Also related to co-pending U.S. patent application Ser. No. 09/587,126, filed concurrently herewith, entitled: "Time Compensation Architectures For Controlling Timing Of Optical Signals" by Stephen Palese, assigned to the same assignee as this present invention, and its contents are incorporated herein by reference.

Also related to co-pending U.S. patent application Ser. No. 09/586,014, filed concurrently herewith, entitled: "Electro-Optic Device For Adding/Subtracting Optical Signals" by Stephen Palese, assigned to the same assignee as this present invention, and its contents are incorporated herein by reference.

Also related to co-pending U.S. patent application Ser. No. 09/587,125 now U.S. Pat. No. 6,516,103, filed concurrently herewith, entitled: "Optical Interconnect Capable of Performing Addition/Subtraction" by Stephen Palese, assigned to the same assignee as this present invention, and its contents are incorporated herein by reference.

BACKGROUND OF THE INVENTION

1. Field of the Invention

The present invention generally relates to an optoelectronic communication system, and more particularly to an optoelectronic communication system in a turbulent medium that employs a receiver having an array of optical fibers and photodetectors.

2. Description of the Prior Art

The telecommunications industry is switching rapidly to a hybrid platform which utilizes both electronics and photonics to increase the operating bandwidth of the communication system. Today's communication systems consist of optical fiber networks, fiber amplifiers, optical diode transmitters, and high speed semiconductor receivers. This architecture works well in the confines of optical fibers, however, free space propagation of these signals which is necessary for remote applications have problems in matching optical fiber network bandwidths.

Free space propagation of the signal through the atmosphere, water or other turbulent media introduces fluctuating distortions and aberrations. These fluctuating distortions prevent focusing the signal beam onto the small area high speed detectors typically utilized in optical communication systems. An optical transmitter, for example, including a 0.05 m collection dish with a focal length of 1 m would concentrate the light into a diameter of 200 $\mu$m for a 100 times diffraction limited optical communication beam. Aberrations similar to this could be incurred by atmospheric propagation at a wavelength of 1.5 $\mu$m. This area is approximately 300 times larger than that of the high speed semiconductor photodiode detectors employed in conventional communication systems. One approach is to correct for the fluctuating distortions with adaptive optics or phase conjugation techniques in order to obtain a near diffraction limited signal beam which allows focusing onto a small high speed receiver. These techniques suffer from the slow response time, limited phase front correction or high signal intensities required for efficient conjugation. Another approach is to use a large area detector in the optical receiver so that a significant fraction of the distorted signal beam can be collected by the receiver. This method has many advantages but has proven difficult to implement since the detector temporal response and the detector area are often inherently coupled.

What is needed, therefore, is an optoelectronic communication system with integrated high speed small area detectors in an optoelectronic receiver architecture which provides a large effective area receiver while it retains the large intrinsic bandwidth of the individual detector elements.

In addition, it is desirable for the optoelectronic receiver to develop time compensated electrical signals.

SUMMARY OF THE INVENTION

Transmission of an optical signal through a turbulent media, such as the atmosphere, produces a fluctuating spatial intensity pattern due to optical distortions and aberrations. With respect to FIGS. 1A, 1B, and 1C, three views are shown of an optical signal being transmitted through a turbulent media at three instants of time, $t_1$, $t_2$ and $t_3$, respectively. These time varying distortions make it impossible to focus the signal beam onto a single small high speed detector illustrated by the numeral 10 typically utilized in optical communication systems. The present invention involves collecting either a large enough subarray of the distorted signal (shown by the numeral 12) or the entire distorted signal (shown by the numeral 14 and encompassing the periphery in FIGS. 1A, 1B and 1C) with a detector array. The collected signal is invariant to the fluctuating distortions, thereby eliminating problems in free space propagation of optically transmitted high bandwidth signals.

The invention involves combining high speed small area photodetectors utilizing an optoelectronic interconnect, preferably with a time compensated reading (probe) beam methodology into a receiver to increase the effective detector area while maintaining the temporal response (high bandwidth). The large effective area detector captures all of the signal beam thereby eliminating problems with regard to optical signal transmission through turbulent media. This detector array directly measures temporal pulses, however, it is applicable to both temporally, phase or frequency encoded signal sources. Phase encoded information would require an optical interferometer before the photodetector array to convert the phase modulation into temporal information.

In another aspect, this invention also involves using a separate transmission beam and reading (probe) beam. A decoupled architecture allows each of the optical wavelengths to be optimized for their own individual function. For example, the transmission wavelength can be chosen to increase signal throughput through the turbulent media while the reading beam could allow for dispersion free fiber propagation, the highest photodetector efficiency or the fastest temporal response.

The described construct utilizes optoelectronic sampling to combine the electric fields from each of the photodetectors in the array. Optoelectronic sampling utilizes an electro-optic material (for example $LiTaO_3$, $LiNiO_3$, GaAs, or birefringent polymers) with the birefringent axis properly oriented with respect to the electric field and an optical probe beam. The probe beam can either be continuous wave to provide real time signal processing or pulsed (i.e., mode-locked, Q-switched) to provide a high speed time gated detector capability. Depending on the orientation of the electric field and optical probe beam polarization relative to the birefringent axis of the electro-optic crystal this field can be made to induce a time dependent polarization rotation or a time dependent phase change on the optical probe beam. This change varies with the electric field strength and therefore with the light intensity incident on the photodetector. Typically the electro-optic response can be made to be either quadratic (homodyne configuration) or linear with the electrical field strength (heterodyne configuration) depending on the probe beam configuration. The temporal resolution of electro-optic sampling is limited by the propagation delay of the optical probe beam across the region where the electric field exists and by the optical phonon band which is materially dependent and typically occurs in the 3–10 THz range. This corresponds to 100–300 fs, respectively, for a full width period at half maximum frequency. For the small area photodetectors having a diameter of approximately 15 $\mu$m that are utilized in today's high bandwidth communications systems, the propagation delay across individual elements would be of the order of 100 fs. Depending upon the temporal response of the individual photodetector elements, the effective area of the photodetector array and the required temporal response (bandwidth) of the array different time compensation configurations can be adopted for the receiver.

Calculations of the effective areas of photodetector arrays for the following architectures, assuming an intrinsic detector element response time of 5 ps and a detector array requirement of less than 6 ps temporal resolution indicate that (1) Without time compensation—the effective detector area can be increased by 33 times; (2) For one dimensional time compensation where an optical element is utilized to compensate the signal across each row (or column) of fibers so one element of each row (or column) is time coincident with the probe beam, the effective detector area can be increased by 1000 times. The optical element could be an optical wedge or stacked optical plates; and (3) For two dimensional time compensation (i.e., element by element time compensation) where an optical element is utilized to compensate the signal at each photodetector element, there is no limit to the effective receiver area with regard to temporal resolution. This two dimensional optical element could be a stepped optical wedge or the time compensating could be accomplished by the preferred method of tailoring the optical fiber lengths themselves.

The temporal resolution of the element by element time compensated device is currently limited by the speed of today's photodetector elements, i.e., 5 ps, 60 GHz. However, as this speed increases either through advances in fabrication techniques, use of other materials or new configurations, the electro-optic sampling interconnect will be capable of supporting temporal resolution of the order of 100 fs which corresponds to data rates of 10 THz.

There are a number of techniques which can be utilized to increase the operational bandwidth even further. Wavelength multiplexing akin to that used in fiber optic systems can also be applied to increase this receiver's operational bandwidth. A spectrally selective optical element, such as a Bulk or a fiber Bragg grating, an acousto-optic or electro-optic deflector, a prism, or an interference filter would be utilized to route the different wavelengths to a different detector array. The receiver bandwidth would therefore increase linearly with the number of signal wavelengths. Fiber based wavelength multiplexing, for example, has expanded bandwidths by factors of greater than 100 times.

In this invention, amplitude modulation of the reference beam could be utilized along with the temporal or phase modulation of the signal beam to encode information. For example, with a signal to noise level of greater than 64:1, 6 bits of information could be encoded instead of 1 bit per pulse allowing an increase in the total bandwidth by a factor of 6. The detector effective area will ultimately be limited by signal to noise constraints instead of temporal resolution. There are a number of methods to increase the signal to noise ratio. For example, the signal beam can be optically amplified in a solid state gain media before entering the fiber array, the fibers themselves could serve as optical amplifiers, or the detector array can be thermally cooled.

The preceding and other shortcomings of the prior art are addressed and overcome by the present invention that provides generally an optoelectronic communication system for use with an optical signal that passes through a turbulent environment comprises an optical transmitter for transmitting an optical signal, and an optoelectronic receiver. The optoelectronic receiver comprises an optical reflector for collecting the optical signal and for propagating a plurality of portions of it, a plurality of first optoelectronic detector means, each being responsive to a selected portion of the optical signal and operative to develop a plurality of electrical signals, each representing a portion of the information, a probe laser for generating an optical probe beam, means responsive to the plurality of electrical signals and operative to change a characteristic of the optical probe beam corresponding to the information, and a second detector responsive to the changed characteristic and operative to develop an output or resultant signal representative of the information contained in the received optical signal. The output signal may be electrical or optical.

In another aspect the present invention provides an optoelectronic receiver for receiving an optical signal and includes high speed small area detectors arranged in a time compensated architecture.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

BRIEF DESCRIPTION OF THE DRAWINGS

FIGS. 1A, B and C are drawings that show an optical signal pattern as it is transmitted through a turbulent media, such as the atmosphere, at three different times.

DETAILED DESCRIPTION OF THE PREFERRED EMBODIMENTS

Figure 2:
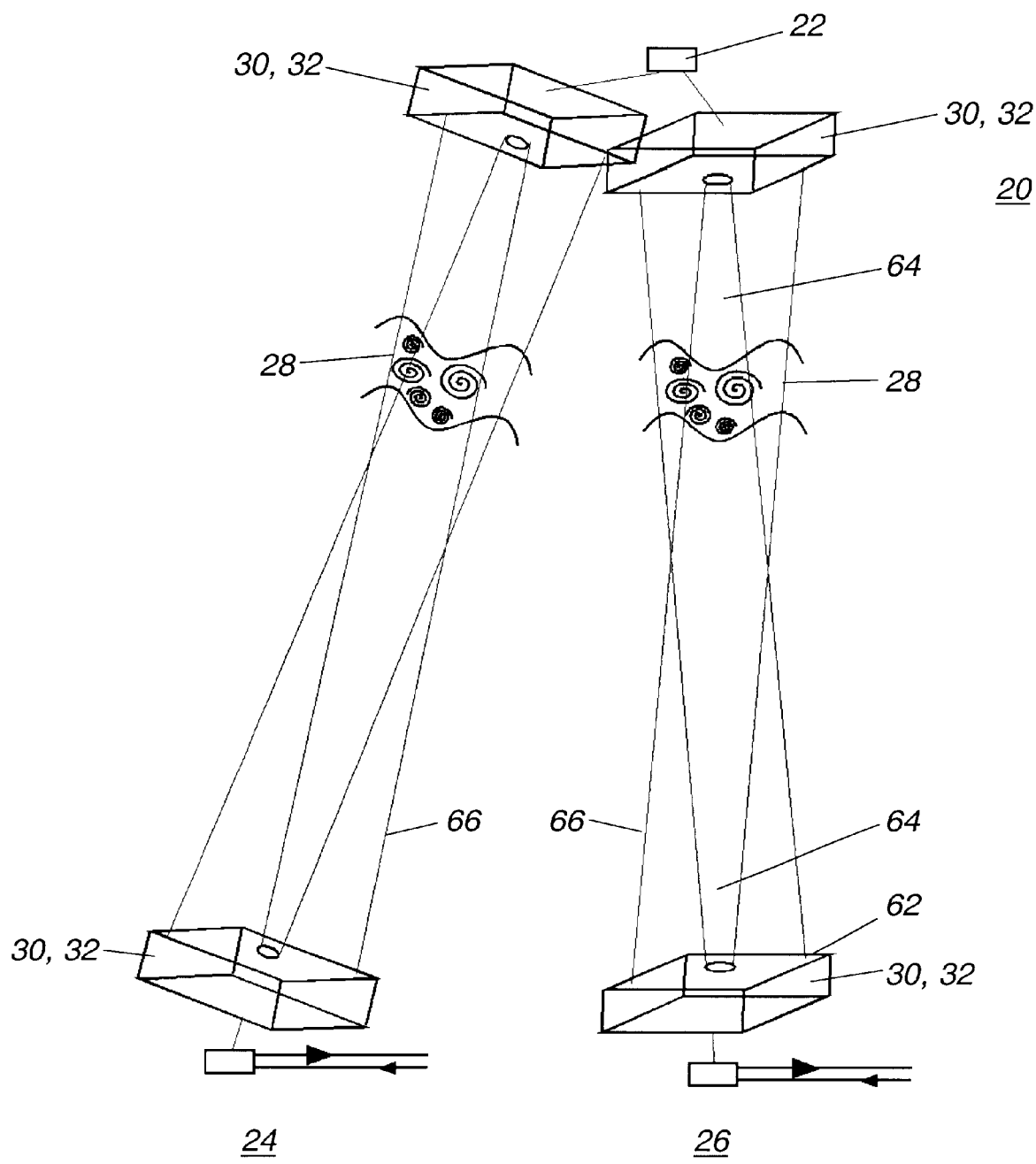
FIG. 2 is a block diagram of the optoelectronic communication system in accordance with the present invention.

As illustrated in the block diagram of FIG. 2, the present invention provides an optoelectronic communication system, generally designated by the numeral 20. Briefly, the system 20 communicates between a satellite 22 and ground stations 24 and 26 through a turbulent medium 28, e.g., the atmosphere. Alternatively, the communication could be between submarines where the turbulent medium is water or between aircraft or ground stations where the turbulent medium is air as long as there is a line of sight path between the transmitting and receiving stations.

The system 20 includes an optical transmitter 30 and optoelectronic receiver 32 at each ground station 24, 26 and two transmitter/receiver assemblies on board the satellite 22.

As previously described, transmission through the atmosphere 28 produces a fluctuating spatial intensity pattern due to optical distortions and aberrations. These time varying distortions (see FIG. 1) make it impossible to focus the signal beam onto the single small high speed detector 10 typically utilized in current optical communication systems. This invention involves collecting either a large enough subarray 12 of the optical signal or the entire distorted signal 14 with a detector array. The subarray 12 would collect about 140 times the power that could be collected by a single detector as shown by the numeral 10. The collected signal is invariant to the fluctuating distortions, thereby eliminating problem in free space propagation of optically transmitted high bandwidth signals. In particular, the fluctuation is calculated to be reduced from a 60% mean fluctuation (collected by detector 10) to less than 5% mean fluctuation.

Figure 3:
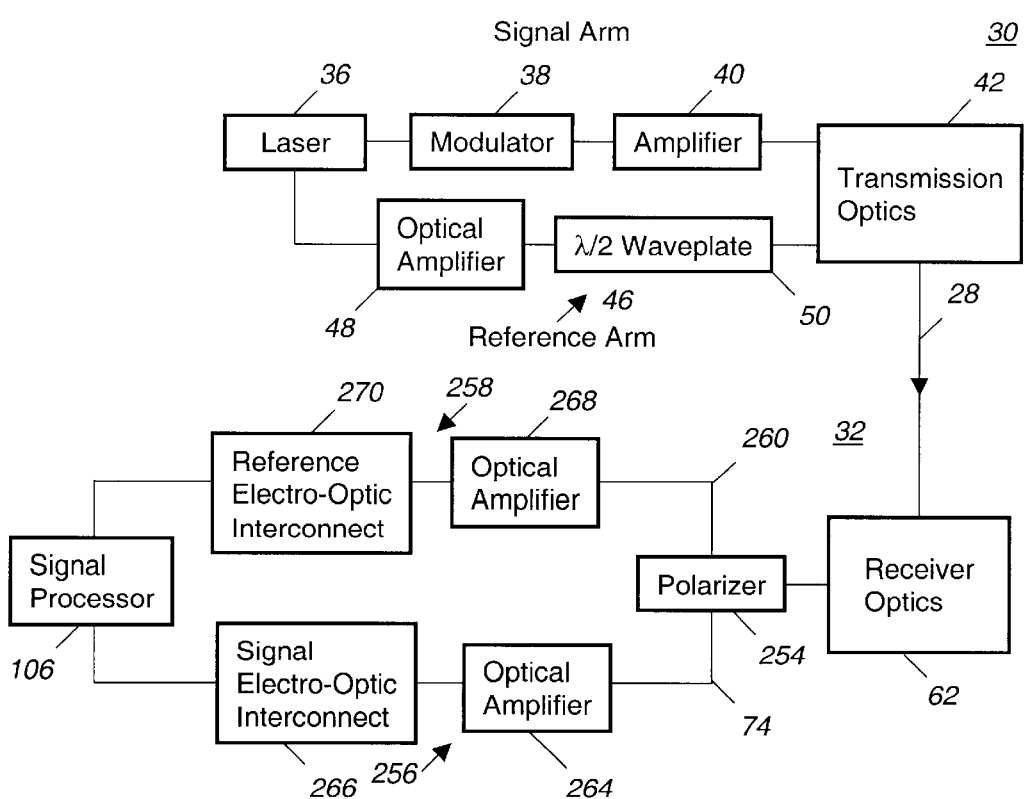
FIG. 3 is a block diagram of the optical transmitter and the optical receiver.
Figure 4:
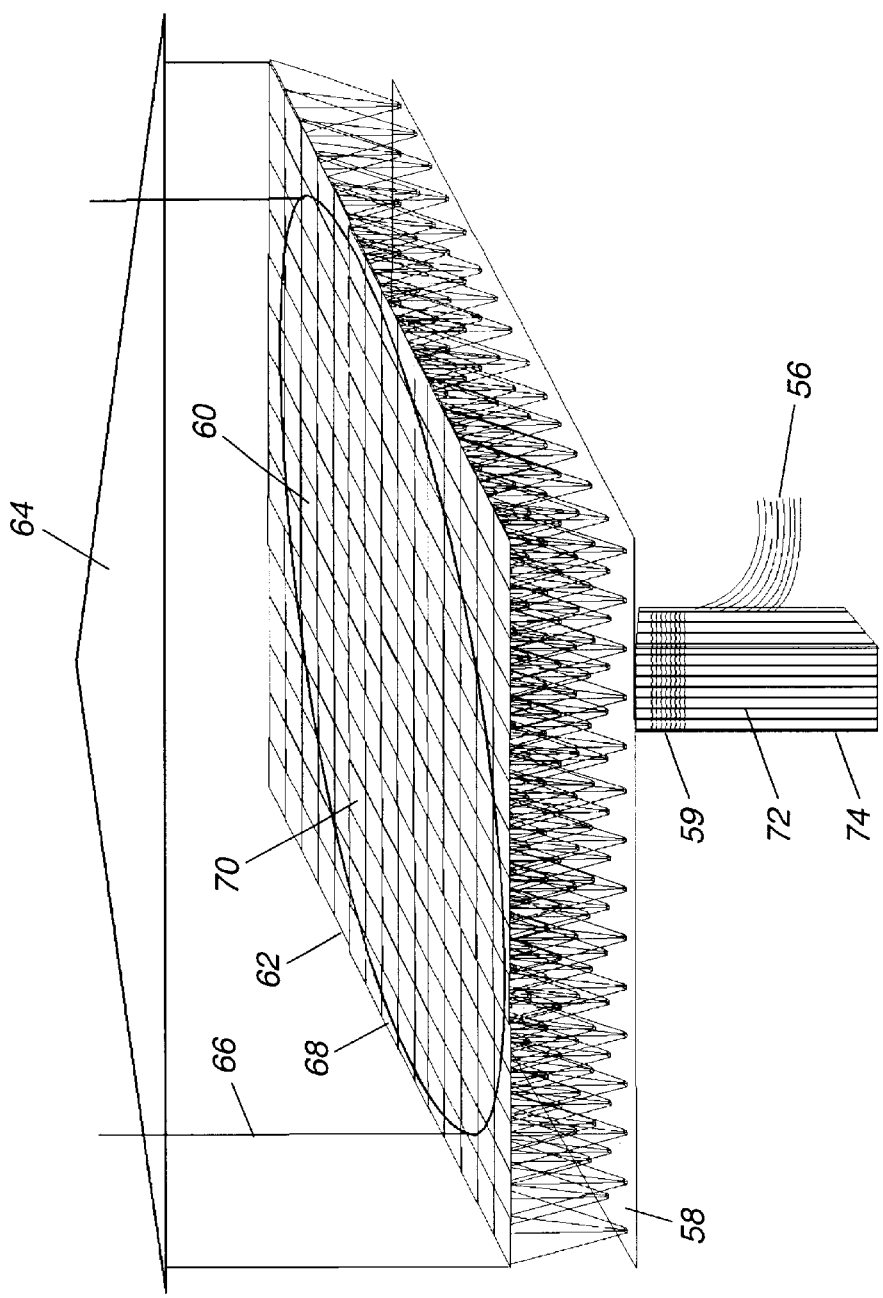
FIG. 4 is a perspective view diagrammatically illustrating the optical transmitter and optoelectronic receiver in accordance with the present invention.

Also, with reference to FIGS. 3 and 4, the optical transmitter 30 comprises a laser source 36 for producing an optical signal, a modulator 38 for modulating the optical signal, an amplifier 40 for amplifying the modulated optical signal and an optical element 42 for directing and radiating the optical signal to a ground station.

In the preferred embodiment, the laser source 36 is an erbium fiber laser and/or semiconductor laser which would operate in the atmospheric transmission regions in the ultraviolet, visible and infrared portions.of the spectrum. An erbium fiber laser operating at 1.5 μm in the infrared with these characteristics and that produces a 10 watt signal is sold by Lucent Inc. and IRE-Polus. The modulator 38 is a lithium niobate (LiNbO$_3$) electro-optic modulator sold by New Focus Inc. and the amplifier 40 is a fiber optical amplifier. The optical transmitting element 42 comprises one lens, or lenslet, in a lens array 62, such as one made by Mems Optical.

As will be described in more detail subsequently, when polarized optical signals are transmitted, the optical transmitter 30 also comprises a reference arm 46 supplying an unmodulated reference signal to the optical transmitting antenna 42. The reference arm 46 comprises an amplifier 48 for amplifying a portion of the optical signal and a one-half wavelength waveplate 50 to flip the polarization of the amplified optical signal. This allows two orthogonally polarized optical signals both at the same wavelength with one containing the information and the other containing the reference, to be transmitted to the receiver 32.

Figure 12:
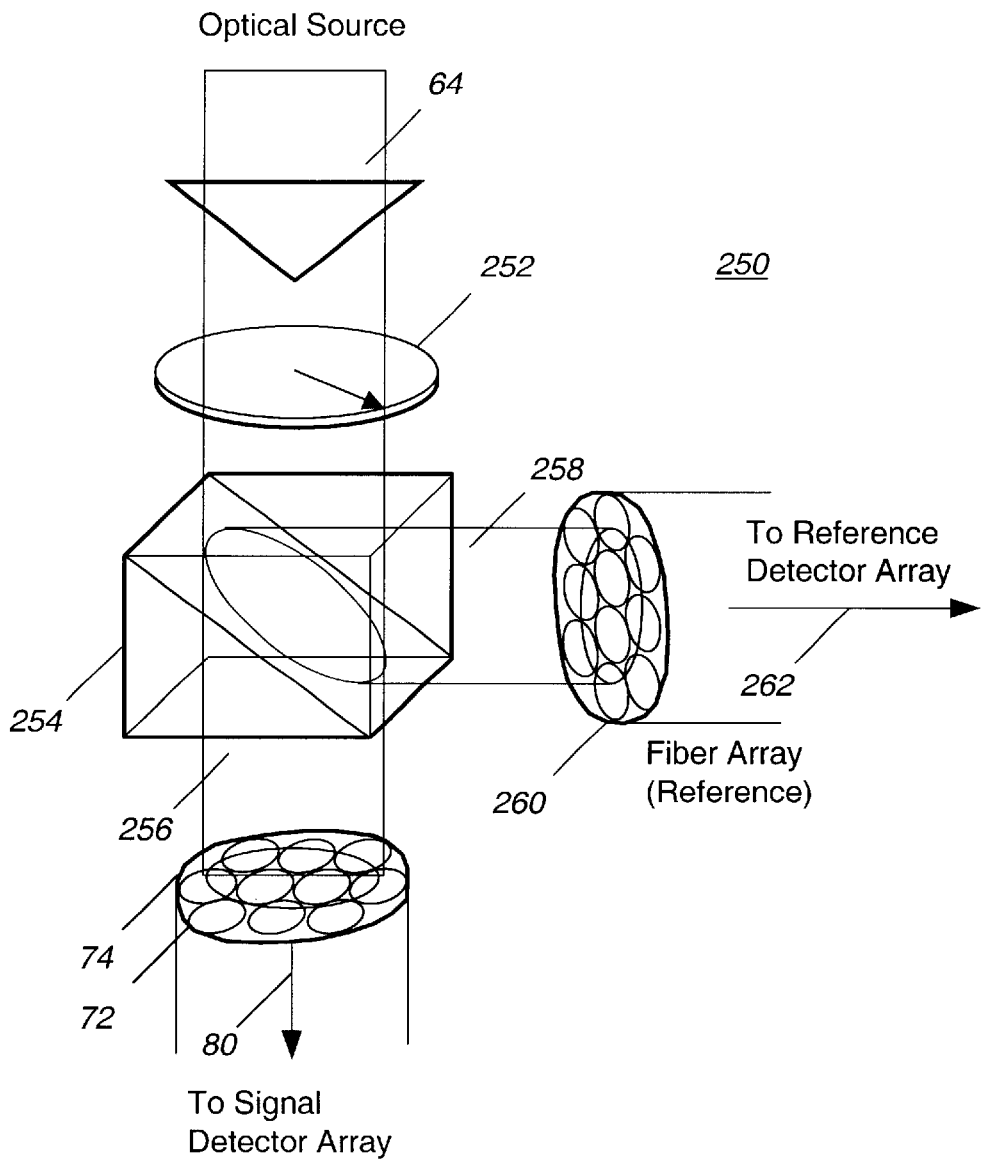
FIG. 12 is a diagram of a portion of an optoelectronic receiver configured to provide polarization multiplexing in accordance with the present invention.

Also with reference to polarization multiplexing shown and described in detail in FIG. 12, the receiver comprises a polarizer 254 to split the received signal into a signal arm 256 and a reference arm 258. A fiber optic array 74 provides the signal to an optical amplifier 264 and a signal electro-optic interconnect 266 to develop a signal component. Similarly, a reference optical array 260 provides the reference to an optical amplifier 268 and a reference electro-optic interconnect 270 to develop a reference component. A signal processor 106 processes the two signals as desired.

Referring also to FIG. 4, the transmitter 30 and receiver 32 are shown as an integrated assembly such that the amplified modulated optical beam generated by the laser source 36 is propagated through an optical transmitter fiber array 56 all attached to openings in an interconnect 58. The individual fibers include Bragg gratings 59 for separating the transmission beam 64 from the received beam 68 by wavelength. Alternatively, Faraday rotators can be employed to separate the transmission and receiving beams based on direction of beam propagation. The propagated beam diverges in the free space from the opening until it reaches its lenslet 60 or lens in a lenslet array 62. Typically for a single mode fiber the divergence is 10°. The lenslets 60 collimate the beam and transmits it as an optical signal 64 into free space through the turbulent medium 28 and toward the selected optical receiver 32.

At the receiver 32 the signal beam, generally designated by the numeral 66, is shown to circumscribe an area 68 on the lenslet array 62. The signal beam 66 is collected by the lenslet array 62. Each receiving lenslet 70 focuses its collected portions of the optical signal radiation (shown by converging lines) through an opening in the interconnect 58 as beamlets and onto an individual optical fiber 72 in an array 74 of optical fibers. The optical fibers 72 propagate the signal beam to an optoelectronic converter 80, or photodiode as shown in FIG. 5.

In the preferred embodiment, the lenslet array 62 is fabricated from plastic and comprises a square matrix of 15×15 lenslets having a total side dimension of between 1 and 100 centimeters. Alternatively, the matrix could be rectangular, hexagonal or octagonal to obtain better fill factors and the number of lenslets could be selected based on distance between the transmitting and receiving stations Also the lenslet array 62 and interconnect 58 are separated by less than 1 centimeter of free space.

Figure 5:
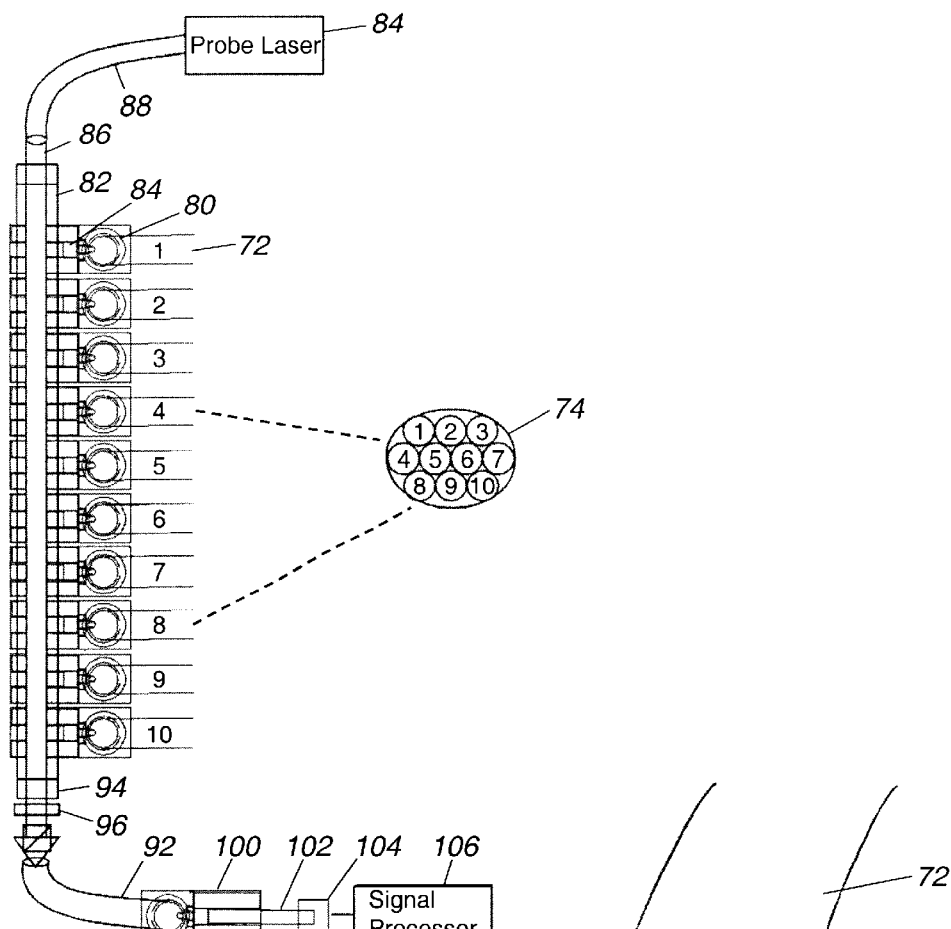
FIG. 5 is a diagram illustrating an optoelectronic array of photodetectors used in the optoelectronic receiver in accordance with the present invention.
Figure 6:
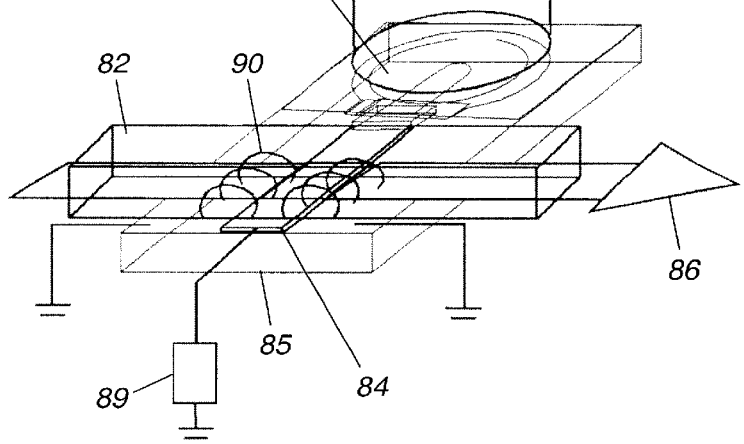
FIG. 6 is a diagram of one element of the optoelectronic photodetector array shown in FIG. 5.

With respect to FIG. 5, an array of optoelectronic detectors 80 is shown. FIG. 6 shows one optoelectronic detector 80 in the array. As illustrated by the numerals 1–10 there are 10 detectors 80 in the array, each having an end attached to one fiber 72 of the array of optical fibers 74. Each fiber 72 propagates a portion of the received optical beam onto one detector 80. The detector 80 comprises a small area high speed semiconductor photodiode that converts an optical signal into an electrical signal. For a detector having an intrinsic response time of 5 ps and a detector array requirement of less than 6 ps temporal resolution, the effective detector area can be increased by 33 times. Alternatively, the detector may be a photocathode microchannel, a superconducting detector or any other photoactivated compound device.

An electro-optic crystal 82 or waveguide extends longitudinally in an orientation orthogonal to the detectors 80. A probe laser 84 generates a probe beam, or reading beam, shown diagrammatically as the numeral 86, longitudinally through a single mode optical fiber 88 and the crystal 82. The probe beam can be either a continuous wave beam to provide real time signal processing or a pulsed beam, such as in a mode-locked or Q-switched embodiment, to provide a high-speed time-gated detector capability. A microwave stripline 84 formed on a nonconducting substrate 85 extends perpendicularly to and supports the crystal and propagates the electrical signal developed by the photodetector 80 to interact with the optical probe beam 86. The stripline 84 is terminated in a 50 ohm load 89 to prevent reflections from propagating back down the stripline which would degrade the temporal resolution. The substrate 85 is connected to the ground to prevent noise or extraneous signals from interfering with the electric signal on stripline 84.

More particularly, the electrical signal carried by the stripline 84 generates an electric field shown diagrammatically by the curved arrows 90 in FIG. 6 that penetrates into the underside of the electro-optic crystal 82 inducing a time dependent polarization rotation or phase change on the probe beam 86. The rotation depends on the crystal axis orientation relative to the electric field 90 created by the stripline signal. Each signal from the photodetectors 80 contributes to the total polarization rotation of the probe beam 86. These changes are converted to an amplitude modulated signal on fiber 92 with a $\lambda/2$ waveplate 94 and a polarizer 96. The $\lambda/2$ waveplate 94 can be adjusted to either homodyne or heterodyne the response. In heterodyne operation, the waveplate 94 is adjusted to allow some of the unmodulated probe beam 86 to pass through the waveplate. This sets up a local field that mixes with the signal and is used for linear operation.

The polarizer 96 converts the polarization rotation induced on the probe beam 86 to a time dependent amplitude modulation. For homodyne operation the waveplate 94 is adjusted and the polarizer 96 is crossed so no light leaks through when there is no voltage developed on a photodetector 80. For both heterodyne and homodyne operation, the polarizer 96 analyzes changes in the phase and polarization of the probe beam 86 produced by the electro-optic effect. A probe high speed photodetector 100 converts the amplitude modulated probe beam into a resultant electrical signal on conductor 102 to an output 104 for application to a signal processor 106. This represents the optical signal 64 transmitted by the transmitter 30. Each signal photodetector 80 contributes to the total polarization rotation of the probe beam 86. Alternatively, the optical signal can be amplified and sent directly through a ground based optical fiber network (not shown) such that the resultant output signal is optical.

In operation, the modulator 38 provides amplitude or phase modulation to the signal generated by the laser source 36 on board the satellite 22. The AM or FM optical signal is amplified and transmitted into free space through the lenslet 60 in the array 62 towards the receiver 32. The transmitted optical beam 64 is distorted and fluctuates in spatial intensity as it passes through the atmosphere.

At the receiver 32 at the earth station 24 each lenslet 70 collects its respective portion of the fluctuating optical beam 64 that is AM or FM modulated. The total collected by the array 62 of lenslets is designated as the received signal beam 66. Each lenslet 70 focuses its collected energy as a converging beamlet onto its associated optical fiber 72 which propagates the optical signal to an optoelectronic detector 80 in the array. The detector converts the optical signal into an electrical signal. The electrical signal is propagated down the stripline 84 to the 50 ohm load 89. The propagating electrical signal creates an electric field 90 outside the stripline 84. The electric field penetrates into the surface of the electro-optic crystal 82 and induces a time dependent polarization rotation or phase change on the probe beam 86. Each detector 80 in the array induces a rotation or phase change corresponding to the received optical signal carried to it by its optical fiber. The $\lambda/2$ waveplate 94 and polarizer 96 are adjusted to convert the total rotation or phase change to a resultant probe beam into a time dependent modulated optical signal. The probe high speed detector 100 converts this into an electrical signal representative of the modulated optical signal transmitted by the satellite transmitter 30. This is applied to the signal processor 106 which demodulates and further processes the electrical signal as desired.

Figure 7:
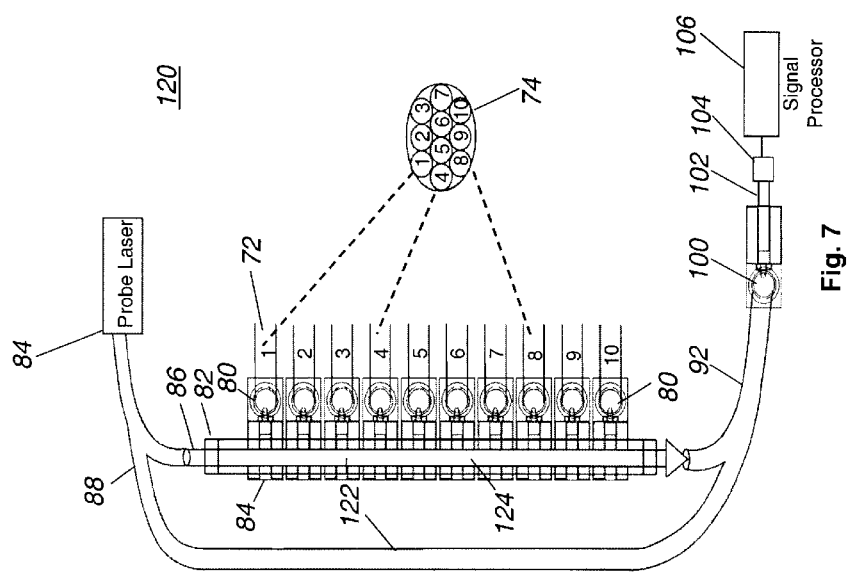
FIG. 7 is another embodiment of the optoelectronic array of photodetectors used in the optoelectronic receiver in accordance with the present invention.

An alternative embodiment of the optoelectronic detector array 110 is illustrated in FIG. 7. Many of the elements of the apparatus 110 are identical to like parts in the apparatus illustrated in FIGS. 5 and 6 described above, and accordingly, there have been applied to each part of the apparatus in FIG. 7 a reference numeral corresponding to the reference numeral that was applied to the like part of the apparatus described above and shown in FIG. 1.

The fundamental difference between the structure shown in FIG. 5 and the structure shown in FIG. 7 is that the structure shown in FIG. 7 comprises a Mach-Zehnder interferometer 120 and does not incorporate a $\lambda/2$ waveplate or polarizer. Each signal photodetector 80 contributes to the total phase change of the probe beam 86. The fiber based Mach-Zehnder interferometer 120 comprises a reference leg 122 and an adjustable leg 124 which comprises the path of the probe beam through the electro-optic crystal 82. As was described, passage of the probe beam through the crystal varied depending on the electric signals produced by the optoelectronic detectors 80.

The system and method of this invention can utilize many other types of optical interferometers. The optical interferometer splits light into two separate optical paths and then recombines this light interferometrically to create optical outputs that can present constructive and destructive interference. The wavelength of light and the relative optical path lengths of the two legs in the interferometer determine the particular state of interference that takes place when the light is combined. This state of interference determines if the output, or destructive interference, in which case there is an absence of optical intensity output. When one of the two optical path lengths within the interferometer is made to be adjustable, the state of interference can be continuously varied between the constructive and destructive interference states. The interferometer 120 serves to translate this phase change into a time dependent amplitude modulation which is detected by the probe high speed photodetector 100.

In operation the light on the optoelectronic detector 80 in turn causes a phase delay in the probe beam. When there is no light on the detector 80 no phase delay occurs. This consequently unbalances the interferometer 120 and provides a signal to the photodetector 100.

Alternatively, the length of the reference leg could be changed by $\lambda/2$ to change the interference pattern produced to be constructive or destructive as desired, and also the optical signal can be amplified and sent through an optical fiber network instead of to the photodetector. Thus, the resultant signal is optical.

Figure 8:
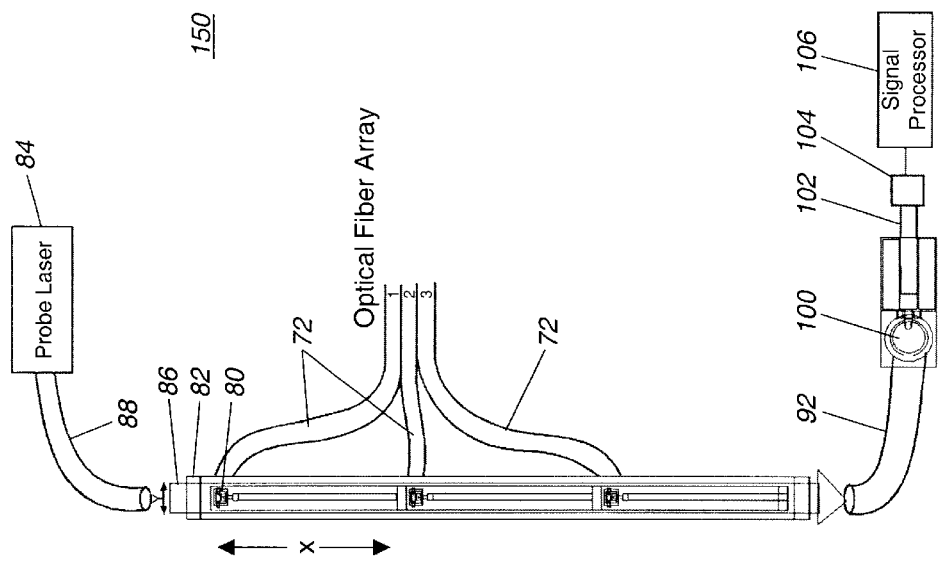
FIG. 8 is a diagram illustrating an alternative embodiment of the optoelectronic array of photodetectors used in the optoelectronic receiver in accordance with the present invention.
Figure 9:
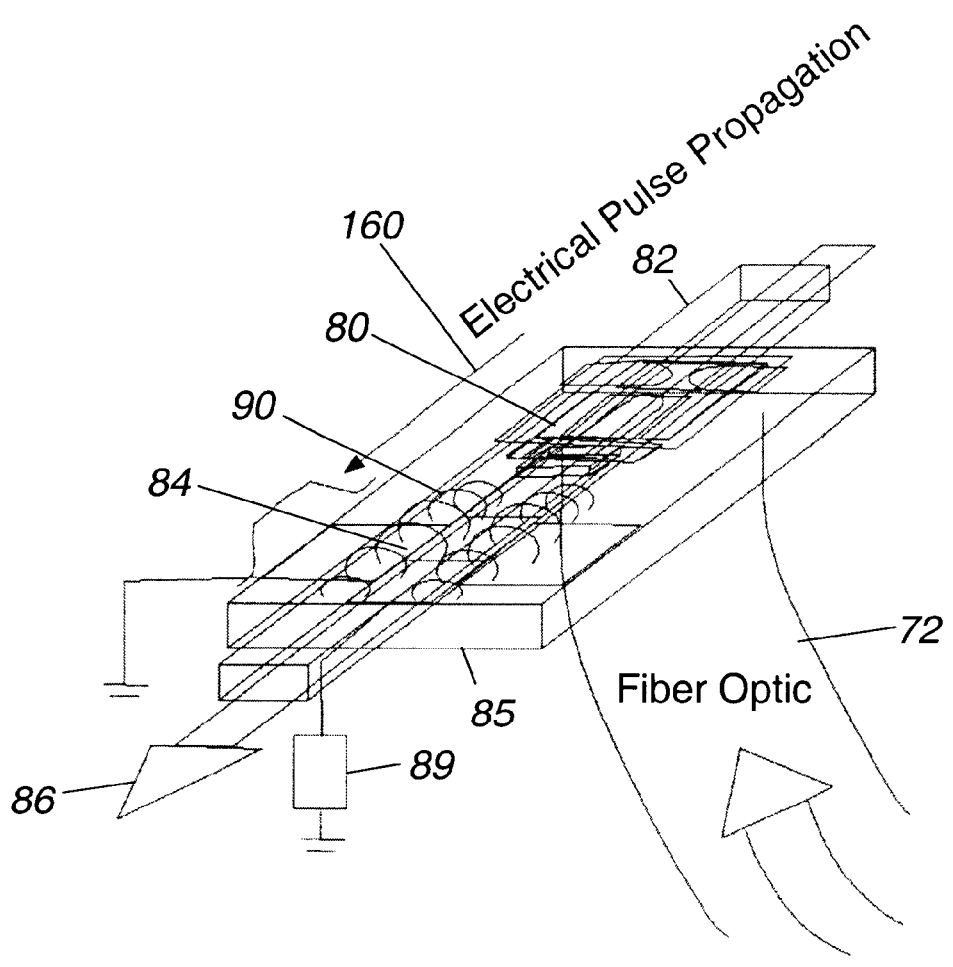
FIG. 9 is a diagram of one element of the optoelectronic photodetector array shown in FIG. 8.

Referring now to FIGS. 8 and 9, yet another embodiment of the optoelectronic detector array 150 is shown. This embodiment is referred to as an optoelectronic velocity matched detector array. In this configuration the array of detectors 80 is linearly arranged. Many of the elements are identical to those described and shown relative to FIGS. 5 and 6 and like numerals have been applied to identical elements. FIG. 9 shows one optoelectronic detector 80 in the array. As shown, the velocity matched detector 80 is preferably one that is sold by the University of Rochester, and is back illuminated by the optical signal. Note that the signal is transmitted through the optical fiber 72 and the substrate 85 to the detector 80. This facilitates connection of the optical fiber to the detector. Generally it is desired to have the fiber as close as possible to the detector. It has been found that for ultraviolet wavelengths of the signal beam, back illumination works best, otherwise front illumination is used.

The fundamental difference between this optoelectronic velocity matched detector array and the embodiment illustrated in FIG. 5 is that the electrical signal designated by the numeral 160, and the optical probe beam 86 propagate in the same direction.

The ratio width of the probe beam 86, x, to the distance between photodetectors 80, y, is defined as the aspect ratio. The relative aspect ratio depends on the required array temporal response, the temporal response of the individual photodetectors 80, and the degree of velocity matching achieved between the microwave striplines 84 and the propagation of the probe beam 86 through the electro-optic crystal 82. It is believed that good results can be obtained when x=5 mm and y=20 microns.

In this embodiment, the signal beam 80 is transmitted through the optical fiber 72 and the substrate 85 material to the photodetector 80. This produces an electrical pulse which propagates down the microwave stripline 86 to the terminator 89. The propagating electric field 90 penetrates into the electro-optic crystal 82 inducing a time dependent polarization rotation or phase change on the probe beam. In the velocity matched configuration, the electrical signal 160 and the optical probe beam 86 propagate in the same direction leading to smaller transit time broadening (high frequency response) and/or longer effective crystal lengths (increased modulation depth of the probe beam).

Figure 10:
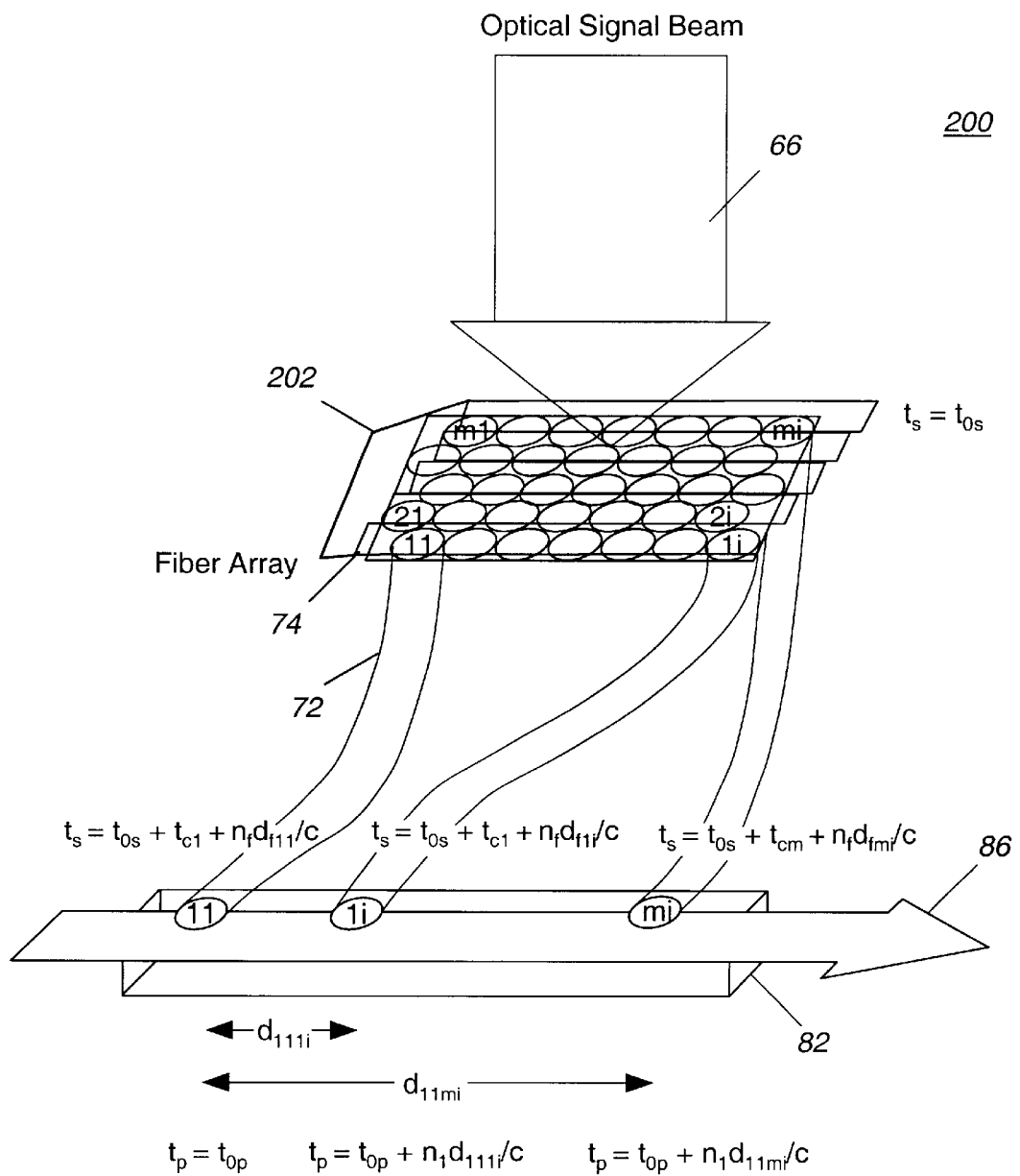
FIG. 10 is a diagram illustrating a configuration for providing time compensation for use with the optoelectronic photodetectors in accordance with the present invention.
Figure 11:
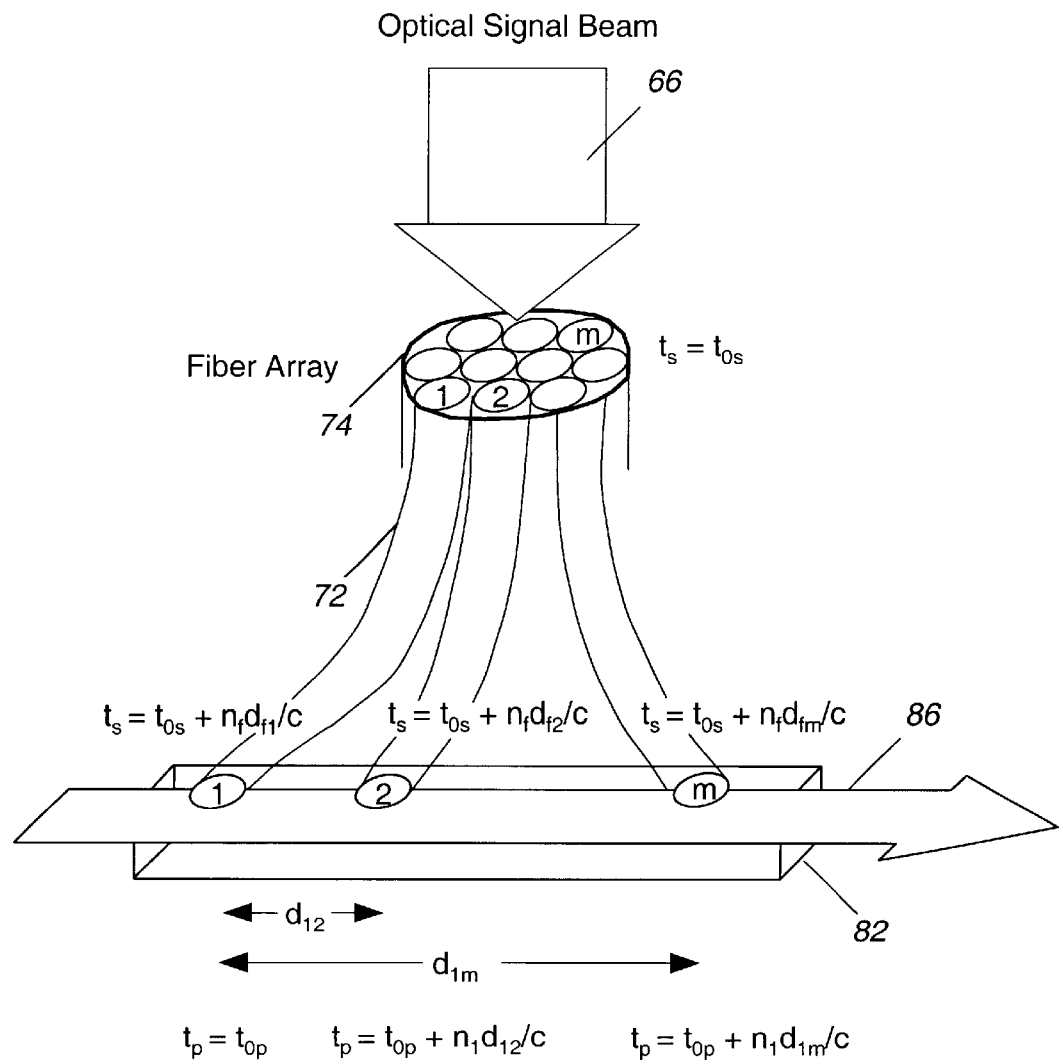
FIG. 11 is a diagram of another embodiment for providing time compensation for use with the optoelectronic photodetectors in accordance with the present invention.

Two time compensation architectures are illustrated in FIGS. 10 and 11 and will be subsequently described. The time compensated methodology provides a means for correcting optical delays which occur in a serial reading beam geometry due to the time required for the reading optical beam to propagate.

This propagation time t=nd/c, where n is the material index of refraction, d is the distance, and c is the speed of light. For a large array this propagation delay can seriously degrade the receiver temporal response. For example, a thousand element array of 15 $\mu$m diameter detectors would take 90 ps to read. This is twenty times slower than a typical photodetector temporal response. With a time compensated architecture the arrival of the signal beam at the photodetectors is made to be synchronous (either on a row by row as shown in FIG. 10, or element by element basis as shown in FIG. 11) with the arrival of the reading (probe) beam so that propagation delays do not accumulate. This avoids degrading the receiver bandwidth. This is accomplished by inserting equivalent (compensating) optical delays in a prescribed manner into the signal beam 66.

FIG. 10 shows a one dimensional time compensation system for a serial optoelectronic reading device, generally illustrated by the numeral 200, such as the device shown in FIGS. 5, 7 and 8. Many of the parts of the system 200 are identical in construction to like parts in the apparatus illustrated in FIGS. 5 and 7 described above, and accordingly, there have been applied to each part of the system in FIG. 10 a reference numeral corresponding to the reference numeral that was applied to the like part of the apparatus described above and shown in FIGS. 5 and 7. The collected optical signal 66 arrives at a time compensation element (TCE) 202. The TCE 202 comprises an optical wedge of the kind that is commercially available from several optical device manufacturers. The optical wedge is configured as an m×i matrix. As the TCE 202 lies in front of the optical fiber array 74. The optical signal at time $t_s=t_{os}$, transmits through the TCE 202 and propagates to the optoelectronic detector (not shown) at the end of the fiber at time $$t_s = t_{os} + t_{cm} + n_f d_{fmi}/c$$

where $t_{cm}$ is the time delay in row m of the TCE 202, $n_f$ is the index of refraction of the optical fiber 72, $d_{fmi}$ is the length of the optical fiber in row m and column i, and c is the speed of light.

If the fibers 72 are the same length and no time compensation element is included, then the probe beam 86 and the signal beam 86 accumulate a temporal error equal to $n_1 d_{11mi}/c$ which degrades the array's temporal resolution. The time compensation optical element 202 with $t_{cm}=n_1 d_{m1mi}$ serves to synchronize the probe beam 86 and the optical signal beam 66 at a point in each row of the array so that the temporal degradation is reduced.

Thus, each row is compensated. More particularly, the center element in each row is synchronized with the probe beam 86. Note the other elements in each row are not synchronized. Thus, this technique has some temporal resolution error associated with it, which would be analogous to time jitter. For a square fiber bundle 74, the one dimensional time compensation scheme allows the number of fibers to be squared (i.e., 10 fibers becomes 100 fibers) with the same temporal resolution (frequency bandwidth).

FIG. 11 shows an element by element time compensation architecture. The optical signal beam 66 arrives at the fiber array 74 at time $t_s=t_{os}$ and propagates to the end of the fiber at time $$t_s = t_{os} + n_f d_{fm}/c$$

where $n_f$ is the index of refraction of the fiber 72, $d_{fm}$ is the length of fiber m, and c is the speed of light.

If the fibers 72 are the same length and no time compensation element is included, then the probe beam 86 and signal beam 66 accumulate a temporal error equal to $n_1 d_{1m}/c$ which degrades the array's temporal resolution. As, however, in accordance with this invention the fiber lengths are tailored such that $n_f(d_{fm}-d_{f1})=n_1 d_{1m}$ the probe and signal beam are synchronized at each point in the array. Thus, this embodiment does not degrade the optical reading of the probe beam.

With reference to FIG. 12, an optical architecture 250 for polarization multiplexing is illustrated. As shown, a polarized optical source beam 64 is generated by the optical transmitter 30 via the reference arm 46 at the satellite 22. Hence, the optical source beam 64 produces two orthogonally polarized optical signals, both at the same wavelength with one signal beam containing the information and the other reference beam containing the reference. The receiver 32 includes a half wavelength waveplate 252 to adjust the orthogonality of the polarization.

When adjusted properly, no mixing of the polarized signal beams occurs. This aligns the receiver polarization to the transmitter. A polarizer 254 serves to split the received optical source beam 66 into its signal component 256 and its reference component 258. The signal beam component 256 is supplied to the optical fiber array 74 and, in turn to the detector array via the individual fibers 72 for processing as previously described. The reference beam component 258 is supplied to a reference optical fiber array 260, having a similar configuration to the array 74, and in turn to a reference detector array 262. The array 262 and its subsequent signal processing components are similar to the detector arrays previously described. This configuration allows receiving a signal and a reference beam simultaneously. Both beams contain the same aberrations and distortions since they propagate along the same optical path. This configuration serves to remove unmodulated background and enables amplitude modulation schemes which can increase the receiver bandwidth.

Accordingly, an optoelectronic communication system and receiver and method for receiving an optical signal that passes through a turbulent environment is provided. In this system, the receiver comprises an array of optoelectronic detectors that are configured to develop electrical signals representative of the transmitted optical signal. Also, a time compensated architecture has been developed.

Obviously, many modification and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An optoelectronic communication system for use with an optical signal that fluctuates as it passes through a turbulent medium comprising:
   means for transmitting an optical signal; and
   an optoelectronic receiver including
      a plurality of first optoelectronic detector means, each being responsive to a portion of said transmitted optical signal and operative to develop a first electrical signal;
      an optical device for propagating a probe beam, said plurality of first electrical signals serving to change the propagation characteristic of said probe beam;
      second optoelectronic detector means responsive to the changed propagation characteristic and operative to develop a resultant signal corresponding to the information contained in the transmitted optical signal.

2. The optoelectronic communication system set forth in claim 1 wherein said first electrical signals are time compensated.

3. The optoelectronic communication system set forth in claim 1 wherein the plurality of first optoelectronic detector means are arranged in an array.

4. The optoelectronic communication system set forth in claim 3, wherein said first optoelectronic detector means comprise small area high speed photodiodes.

5. The optoelectronic communication system as recited in claim 1 wherein said optical transmitter and said optoelectronic receiver are integrated at a station.

6. The optoelectronic communication system as recited in claim 1 and further comprising processing means for processing said resultant signal.

7. An optoelectronic receiver for receiving an optical signal that fluctuates as it passes through a turbulent medium comprising:
   a plurality of first optoelectronic detectors, each being responsive to a selected portion of the optical signal and operative to develop a first electrical signal; and
   an optical device having a propagation characteristic for propagating a probe beam, and being responsive to said plurality of first electrical signals which serve to change the propagation characteristic and being operative to develop a second signal corresponding to the information contained in the received optical signal.

8. An optoelectronic receiver for receiving an optical signal containing information that fluctuates as it passes through a turbulent medium comprising:
   means for collecting the optical signal and for propagating a plurality of portions of it;
   a plurality of first optoelectronic detector means, each being responsive to a selected portion of the optical signal and operative to develop a plurality of electrical signals, each representing a portion of the information;
   means for generating an optical probe beam;
   means responsive to said plurality of electrical signals and operative to change a characteristic of said optical probe beam corresponding to the information; and
   a second optoelectronic detector responsive to the changed characteristic and operative to develop an output electrical signal representative of the information contained in said received optical signal.

9. The optoelectronic receiver as recited in claim 8 and further comprising processing means for processing said output electrical signal.

10. The optoelectronic receiver as recited in claim 8 wherein the information is amplitude modulated.

11. The optoelectronic receiver as recited in claim 8 wherein the information is modulated.

12. The optoelectronic receiver as recited in claim 8 wherein said received optical signal is polarized.

13. The optoelectronic receiver as recited in claim 8 wherein said means for collecting comprises a plurality of lenslets and a plurality of optical fibers.

14. The optoelectronic receiver as recited in claim 13 wherein said plurality of optical fibers is configured in a matrix.

15. The optoelectronic receiver as recited in claim 14 and further comprising time compensation means for synchronizing said plurality of first electrical signals.

16. The optoelectronic receiver as recited in claim 15 wherein said matrix comprises m columns and i rows, and wherein the central optical fiber in each column is synchronized.

17. The optoelectronic receiver as recited in claim 15 wherein each optical fiber comprises a length having a dimension for synchronizing said plurality of first electrical signals.

18. The optoelectronic receiver as recited in claim 13 wherein said plurality of first optoelectronic detector means is configured in a matrix.

19. The optoelectronic receiver as recited in claim 18 wherein said matrix is linear.

20. The optoelectronic receiver as recited in claim 8 wherein said means responsive to said plurality of electrical signals comprises means for propagating said optical probe beam.

21. The optoelectronics receiver as recited in claim 20 wherein said means for propagating comprises an electro-optic crystal.

22. The optoelectronic receiver as recited in claim 20 wherein said plurality of first optoelectronic detectors in said linear matrix is configured in a velocity matched arrangement.

23. The optoelectronics receiver as recited in claim 8 wherein said each of said plurality of first optoelectronic detector means comprises an optoelectronic detector and a stripline.

24. The optoelectronic receiver as recited in claim 8 and further comprising an interferometer having an adjustable leg and a reference leg, each receiving said optical probe beam, and wherein said adjustable leg responds to said plurality of electrical signals to change the phase of said optical probe beam relative to the phase of said optical probe beam propagating through said reference leg.

* * * * *